US011036260B2

(12) United States Patent
Smith et al.

(10) Patent No.: US 11,036,260 B2
(45) Date of Patent: Jun. 15, 2021

(54) KEYBOARD ATTACHMENT TO FOLDABLE DEVICE

(71) Applicant: Lenovo (Singapore) Pte. Ltd., Singapore (SG)

(72) Inventors: Madison Kay Smith, Manhattan Beach, CA (US); Cuong Huy Truong, Cary, NC (US); Brian Hargrove Leonard, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/389,974

(22) Filed: Apr. 21, 2019

(65) Prior Publication Data

US 2020/0333852 A1    Oct. 22, 2020

(51) Int. Cl.
    *G06F 1/16*    (2006.01)
(52) U.S. Cl.
    CPC .......... *G06F 1/1666* (2013.01); *G06F 1/1626* (2013.01); *G06F 1/1643* (2013.01); *G06F 1/1652* (2013.01); *G06F 1/1669* (2013.01)
(58) Field of Classification Search
    CPC .................................................... G06F 1/1669
    USPC .................................................... 361/679.17
    See application file for complete search history.

(56) References Cited

U.S. PATENT DOCUMENTS

| 5,847,698 | A | * | 12/1998 | Reavey | G06F 15/0283 |
| | | | | | 345/173 |
| 5,923,307 | A | * | 7/1999 | Hogle, IV | G06F 3/04897 |
| | | | | | 345/1.3 |
| 5,966,284 | A | * | 10/1999 | Youn | G06F 1/1616 |
| | | | | | 361/679.17 |
| 6,144,358 | A | * | 11/2000 | Narayanaswamy | G06F 1/1616 |
| | | | | | 345/102 |
| 6,362,440 | B1 | * | 3/2002 | Karidis | G06F 1/1616 |
| | | | | | 178/18.01 |
| 6,392,871 | B1 | * | 5/2002 | Yanase | G06F 1/162 |
| | | | | | 345/905 |
| 6,643,124 | B1 | * | 11/2003 | Wilk | G06F 1/1616 |
| | | | | | 312/223.1 |
| 6,700,773 | B1 | * | 3/2004 | Adriaansen | G06F 1/1618 |
| | | | | | 345/156 |
| 6,819,304 | B2 | * | 11/2004 | Branson | G06F 1/1615 |
| | | | | | 345/1.3 |
| 6,859,219 | B1 | * | 2/2005 | Sall | G06F 1/1607 |
| | | | | | 345/1.1 |
| 7,864,517 | B2 | * | 1/2011 | Miller | G06F 1/1618 |
| | | | | | 345/1.1 |
| 8,289,687 | B2 | * | 10/2012 | Weinstein | G06F 1/1677 |
| | | | | | 361/679.3 |
| 8,634,873 | B2 | * | 1/2014 | Jones | H04M 1/0235 |
| | | | | | 455/41.2 |

(Continued)

Primary Examiner — Adrian S Wilson
(74) Attorney, Agent, or Firm — Ference & Associates LLC

(57) ABSTRACT

One embodiment provides a method, including: displaying, on an information handling device, content, wherein the content is displayed across a first surface and a second surface of the information handling device; detecting, using a processor, attachment of a removable keyboard to one of: the first surface or the second surface; and adjusting, based on the detecting, a screen configuration of the content. Other aspects are described and claimed.

16 Claims, 6 Drawing Sheets

(56) References Cited

U.S. PATENT DOCUMENTS

| | | | | |
|---|---|---|---|---|
| 2002/0024499 A1* | 2/2002 | Karidis | ............... | G06F 1/1616 345/156 |
| 2002/0109662 A1* | 8/2002 | Miller | ............... | G06F 1/1616 345/100 |
| 2004/0012509 A1* | 1/2004 | Chen | ............... | G06F 1/1616 341/22 |
| 2004/0108968 A1* | 6/2004 | Finke-Anlauff | ...... | G06F 1/1616 345/1.1 |
| 2004/0190239 A1* | 9/2004 | Weng | ............... | G06F 1/1616 361/679.2 |
| 2009/0034173 A1* | 2/2009 | Shaum | ............... | G06F 1/1616 361/679.28 |
| 2010/0039764 A1* | 2/2010 | Locker | ............... | G06F 1/1669 361/679.29 |
| 2014/0049464 A1* | 2/2014 | Kwak | ............... | G06F 3/0487 345/156 |
| 2014/0204519 A1* | 7/2014 | Wu | ............... | G06F 1/1669 361/679.17 |
| 2014/0204520 A1* | 7/2014 | Wu | ............... | G06F 1/1669 361/679.17 |

* cited by examiner

KEYBOARD ATTACHMENT TO FOLDABLE DEVICE

BACKGROUND

Foldable information handling devices ("devices"), for example smart phones, tablets, laptop computers, hybrid devices, and the like, are becoming increasingly popular in the consumer marketplace. These devices may comprise a flexible primary display screen that may be folded around a hinge joint of the device. The foldable nature of these devices may allow a user to manipulate the physical configuration of the device (i.e., expand or contract it) to suit their desired needs.

BRIEF SUMMARY

In summary, one aspect provides a method, comprising: displaying, on an information handling device, content, wherein the content is displayed across a first surface and a second surface of the information handling device; detecting, using at least one sensor, attachment of a removable keyboard to one of: the first surface or the second surface; and adjusting, based on the detecting, a screen configuration of the content.

Another aspect provides an information handling device, comprising: at least one sensor; a removable keyboard; a first surface and a second surface; a processor; a memory device that stores instructions executable by the processor to: display content, wherein the content is displayed across the first surface and the second surface; detect attachment of the removable keyboard to one of: the first surface or the second surface; and adjust, based on the detecting, a screen configuration of the content.

A further aspect provides an information handling device, comprising: a first content display surface and a second content display surface, wherein the first content display surface is adjacent to the second content display surface; and an attachment mechanism configured to secure a removable keyboard to the information handling device; wherein the information handling device is foldable.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
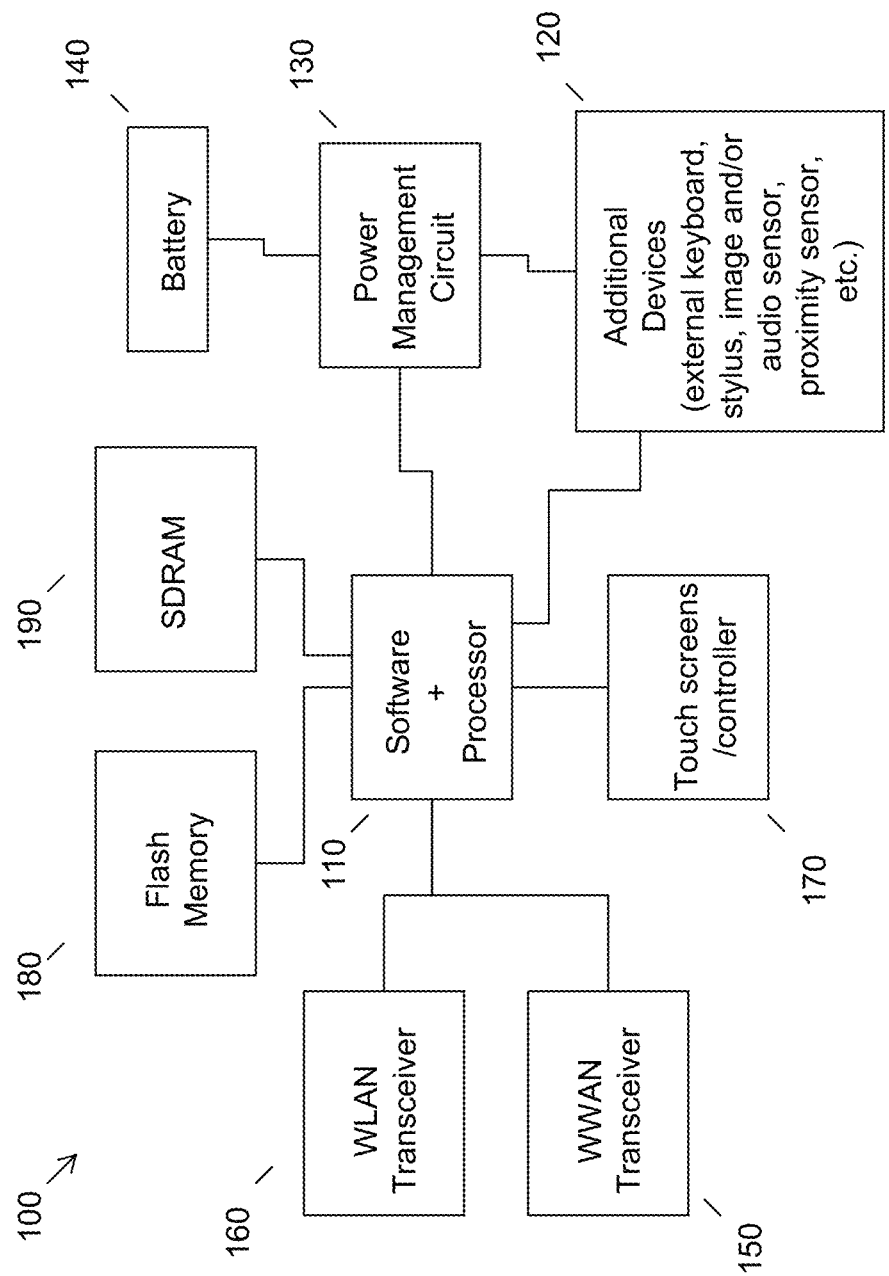
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Modern foldable information handling devices ("devices") generally do not comprise an integrated, tactile keyboard in an effort to make the device as thin and compact as possible. Rather, these devices provide a digital keyboard (e.g., displayed on a flexible primary display of the device, etc.) that a user may interact with via touch input. However, input provision using the digital keyboard may lessen the user input experience. More particularly, a user may not be able to provide input as quickly or as efficiently on a digital keyboard than on a tactile keyboard.

Conventional solutions exist for connecting another input device to the user's device. For example, independent, tactile keyboards may be wirelessly connected to the user's device. Upon pairing, a user may provide keyboard input to the wireless keyboard, which may thereafter be transmitted to and processed by the user device. However, utilization of a secondary input device requires a user to transport and manage multiple devices. Because the majority of wireless keyboards are not constructed to be easily transported with a particular user device, the transport and management of multiple devices may be burdensome to a user.

Accordingly, an embodiment provides a foldable device comprising a keyboard attachment mechanism configured to secure a purposely-proportioned removable keyboard. The foldable device may comprise two content display surfaces located adjacent to one another (e.g., a B-cover and a C-cover of a device, etc.). Magnets may be integrated into the bezel of the B and/or C cover that may interact with corresponding magnetics integrated into the housing of a removable keyboard. The removable keyboard may be designed to fit the footprint of the device when folded. By providing such a design, users may be able to sandwich the keyboard between the content display surfaces, allowing for easy transport and storage of the two devices. Additionally or alternatively, an embodiment may allow a user to attach the removable keyboard to an A-cover of the device, allowing for compact storage of the keyboard when the device is being utilized in a tent-mode.

Additionally, an embodiment provides a method for adjusting a screen configuration based upon attachment of the removable keyboard to a surface of the device. In an embodiment, content may be displayed across a first and second surface of a device (e.g., a B-cover and C-cover of the device, etc.). An embodiment may then identify attachment of a removable keyboard to either the first or second surface and thereafter adjust a screen configuration setting based on the identification. For example, if an embodiment detects that a removable keyboard was attached to the C-cover of a device, an embodiment may thereafter stop displaying content on the C-cover and only display content on the B-cover. Such a method allows for versatility within the hardware and software configuration.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., input devices such as a stylus or a removable keyboard, image and/or audio capture devices such as camera sensors and microphone respectively, other connectable devices, etc. System 100 often includes one or more touch screens 170 for data input and display/rendering. System 100 also typically includes various memory devices, for example flash memory 180 and SDRAM 190.

Figure 2:
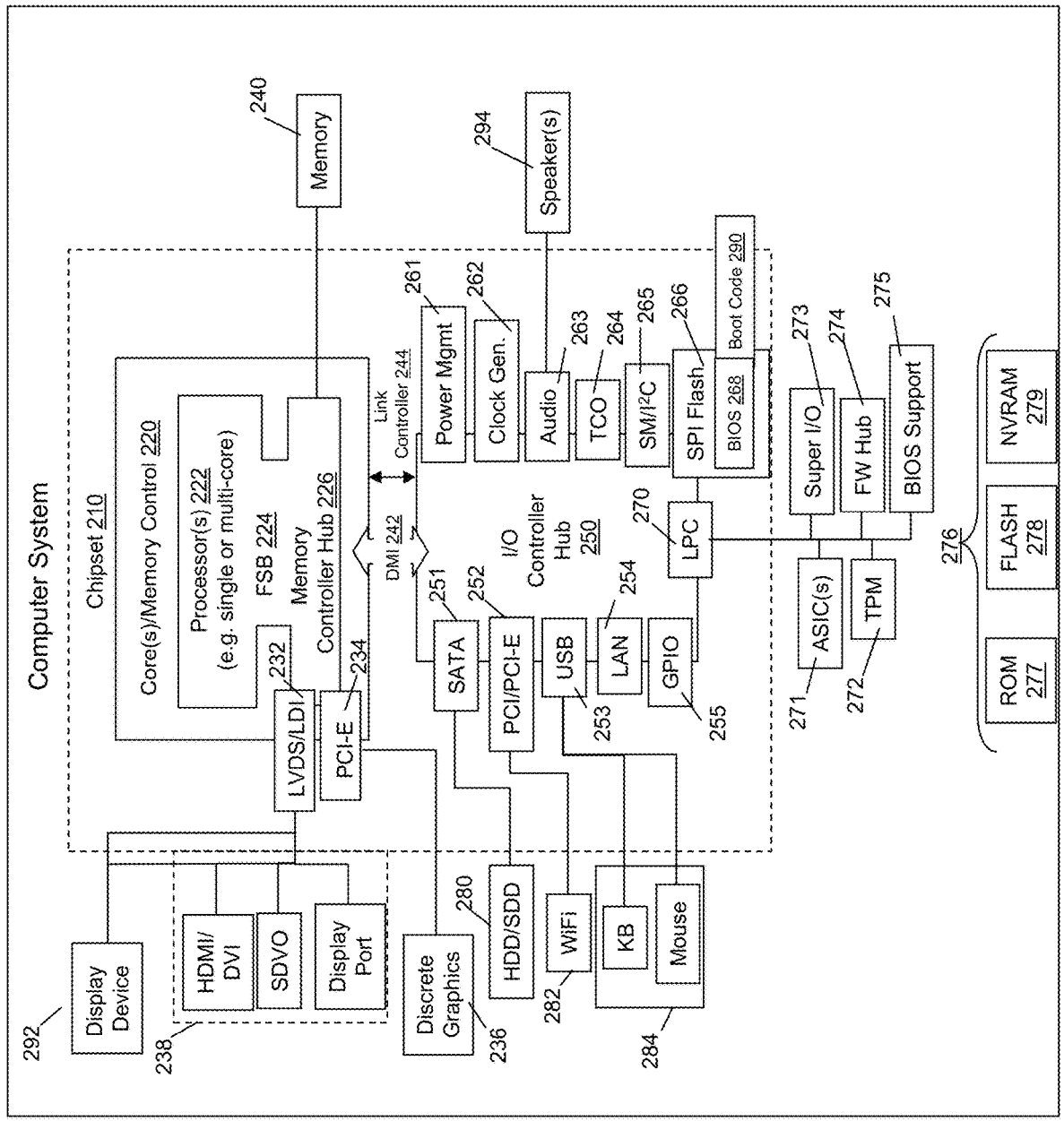
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD and/or YOGA series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in foldable devices such as smart phones, tablets, hybrid devices, and/or other electronic devices that may comprise a flexible display screen and/or comprise a keyboard attachment mechanism. For example, the circuitry outlined in FIG. 1 may be implemented in a smart phone, whereas the circuitry outlined in FIG. 2 may be implemented in a tablet.

Figure 3:
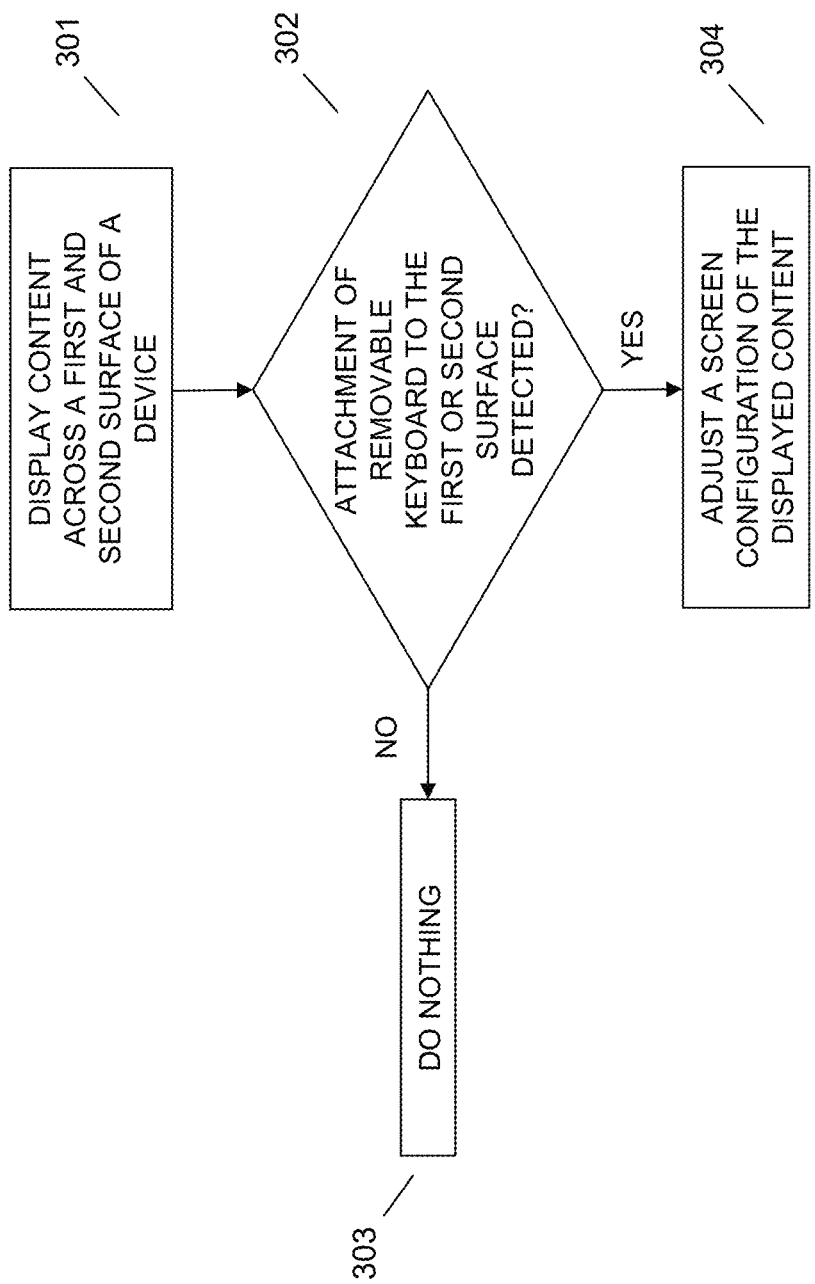
FIG. 3 illustrates an example method of adjusting a screen configuration of a device upon attachment of a removable keyboard.
Figure 4:
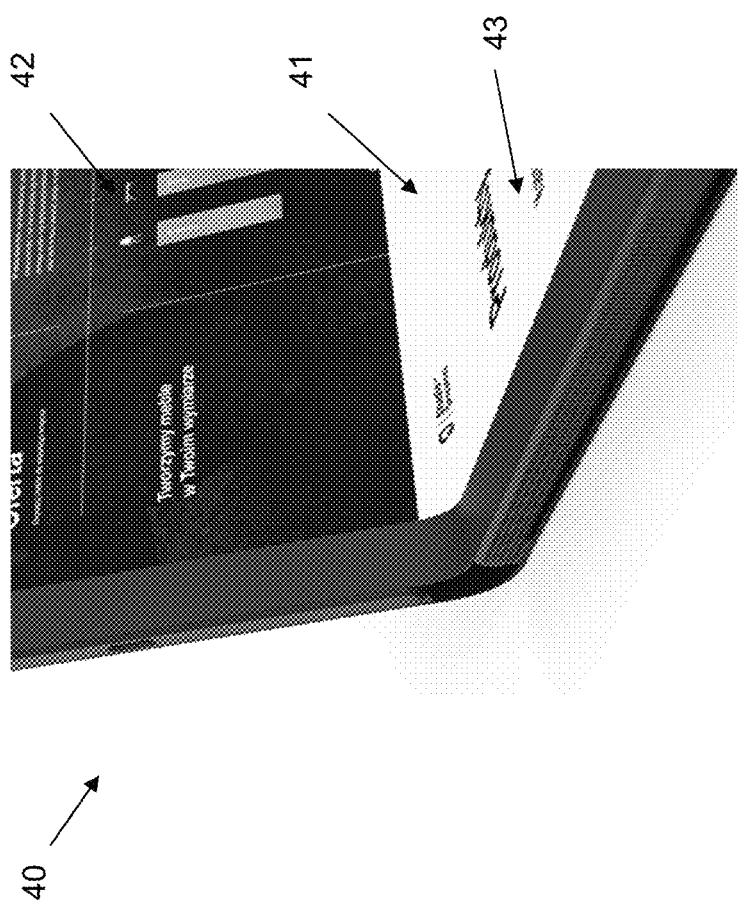
FIG. 4 illustrates an example embodiment of a foldable device.

Referring now to FIG. 3, an embodiment may adjust a screen configuration of a device responsive to attachment of a removable keyboard to a content display surface of the device. At 301, an embodiment may display content on the device. In an embodiment, the content may be displayed on a flexible display screen that is positioned across a first and a second surface of the device. For example, with reference to FIG. 4, a foldable device 40 is illustrated in which a flexible display screen 41 spans across a B-cover 42 and C-cover 43 of the foldable device 40. In this configuration, content may be simultaneously displayed on portions of the flexible display associated with both the B-cover 42 and the C-cover 43.

At 302, an embodiment may detect whether a removable keyboard is attached to either the first or second surface. In the context of this application, the removable keyboard may be a keyboard comprising a conventional keyboard layout (e.g., with alphanumeric buttons, F-buttons, etc.), a touchpad, other data entry control devices, a combination thereof, and the like. Additionally, in the context of this application, the removable keyboard may be a keyboard that is designed to proportionally fit within the first or second surface. Stated differently, the removable keyboard may comprise length and width dimensions that are substantially the same as or less than the length and width dimensions of either the first or second surface. For example, with reference to FIG. 5, a foldable device 50 is illustrated in which a removable keyboard 51 is attached to the C-cover 52 of the foldable device 50. The illustrated removable keyboard 51 comprises slightly smaller length and width dimensions than the C-cover 52 it is attached to.

Figure 6:
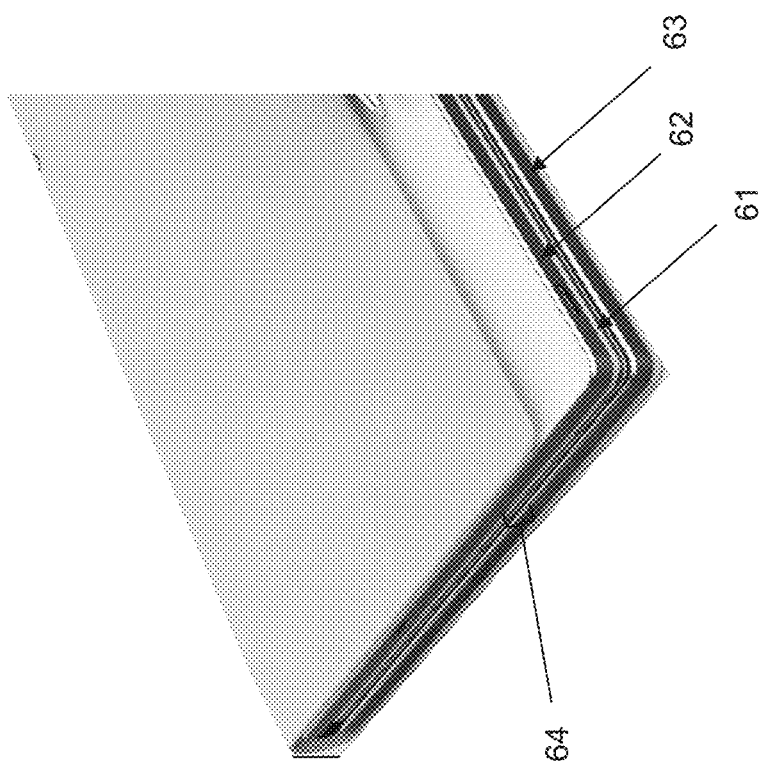
FIG. 6 illustrates an example embodiment of a removable keyboard secured to a surface of a foldable device in a closed orientation.

Additionally or alternatively, the removable keyboard may comprise a height that enables seamless folding of the device. For example, with reference to FIG. 6, a device 60 is illustrated in which the removable keyboard 61 is sandwiched between the B-cover 62 and the C-cover 63 when the device 60 is in a closed, or folded, orientation. Such a configuration may provide additional structural support to the device in the folded orientation. More particularly, when in the folded orientation, a gap 64 exists between the B-cover and the C-cover. The removable keyboard may be designed to have a height less than the gap 64 distance so that the removable keyboard may seamlessly fit between the two covers, thereby securing the removable keyboard to the device and also providing structural support for both covers.

In an embodiment, the removable keyboard may be attached to the device via interaction with an attachment mechanism. In an embodiment, the attachment mechanism may correspond to one or more magnets (not illustrated) embedded in the bezel of the B-cover or the C-cover. These magnets may form a magnetic attachment with corresponding magnets (not illustrated) integrated into the removable keyboard (e.g., positioned on a back portion of the removable keyboard, etc.). Alternatively, the magnets may interact with a metallic portion on the back portion of the removable keyboard to secure the removable keyboard to the device.

In an embodiment, the attachment of the removable keyboard may be detected using one or more sensors integrated into the device (e.g., proximity sensors, camera/light sensors, etc.). In another embodiment, a device may recognize that a removable keyboard has been attached when the device receives an indication that a wireless signal associated with the removable keyboard exceeds a predetermined threshold strength. A person having skill in the art will realize that the above listed device attachment identification techniques are not limiting and that other conventional device attachment identification techniques known in the art may also be used alone, or in combination, with the foregoing.

Although not explicitly illustrated, the device may also be configured to secure the removable keyboard to other surfaces of the device. For example, the device may be configured to secure the removable keyboard to the A-cover of the device in a similar way that it secures the removable keyboard to the B-cover or C-cover, as elaborated upon above. In this embodiment, a user may interact with their device using touch or stylus input but still store the removable keyboard at an unobtrusive location on the device (e.g., when a user is interacting with a device in tent-mode, etc.).

Responsive to determining, at 302, that a removable keyboard has not been attached to either the first or second surface, an embodiment may, at 303, take no additional action. Conversely, responsive to determining, at 302, that the removable keyboard is attached to either the first or second surface, an embodiment may, at 304, adjust a screen configuration of the displayed content.

Figure 5:
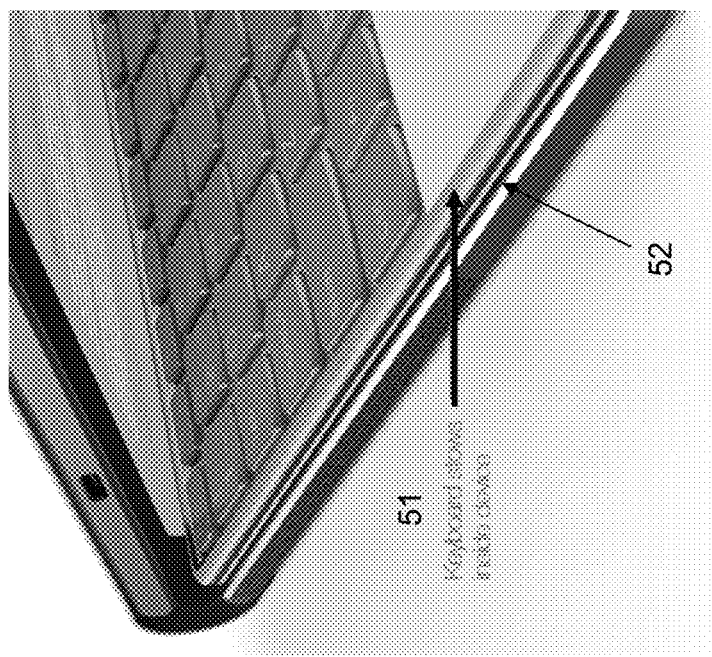
FIG. 5 illustrates an example embodiment of a removable keyboard secured to a surface of a foldable device in an open orientation.

In an embodiment, the adjustment of the screen configuration may include the removal of content from a portion of the flexible display associated with the device surface that the removable keyboard is attached to. For example, if an embodiment detects that a removable keyboard attaches to a C-cover of the device, as illustrated in FIG. 5, an embodiment may cease displaying content on the portion of the flexible display screen associated with the C-cover. Correspondingly, in an embodiment, the entirety of the content may be displayed on the portion of the flexible display associated with the surface not securing the removable keyboard (e.g., the B-cover, etc.). In such a situation, an embodiment may dynamically adjust characteristics of the content to fit the dimensions of the new display area. For example, when attachment of a removable keyboard is detected, an embodiment may initiate a single-surface display mode. In this mode, the size, shape, positioning, layout, etc. of originally displayed objects may be dynamically adjusted to fit the dimensions of the new display area. In an embodiment, the screen configuration adjustments described above may occur automatically, without any additional user input. Stated differently, a user would not be required to manually adjust device settings to limit content display to a single device surface.

In an embodiment, a device may recognize the removable keyboard as an input device subsequent to the attachment. For example, once the removable keyboard is secured attached to the device, a user may interact with the removable keyboard to provide input to the device. Alternatively, an embodiment may recognize the removable keyboard as an input device prior to keyboard attachment.

The various embodiments described herein thus represent a technical improvement to conventional keyboard attachment/securement techniques. Using the techniques described herein, a removable keyboard may be attached to a surface (e.g., A-cover, B-cover, C-cover, etc.) of a foldable device via an attachment mechanism (e.g., one or more magnets, etc.). In an embodiment, the removable keyboard may be sandwiched between the B-cover and the C-cover when the foldable device is in a closed orientation (i.e., when the portion of the flexible display positioned on the B-cover is parallel to the portion of the flexible display positioned on the C-cover). Such a configuration may allow a user to easily organize and transport the removable keyboard and user device. Additionally, the various embodiments described herein thus represent a technical improvement to conventional screen configuration adjustment techniques. Using the techniques described herein, an embodiment dynamically ceases the display of content on the portion of the flexible display associated with the surface securing the removable keyboard. Substantially simultaneously or subsequently, an embodiment may display the entirety of content on the portion of the flexible display associated with the surface not securing the removable keyboard. Such a method allows for versatility within the hardware configuration and the software.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, on an inner area of an information handling device, content, wherein the content is displayed on a flexible display screen situated across a first surface and a second surface of the information handling device;
    detecting, using at least one sensor, attachment of a removable keyboard on top of: a portion of the flexible display screen situated across the first surface or another portion of the flexible display situated across the second surface, wherein the detecting the attachment comprises identifying that a wireless signal associated with the removable keyboard is greater than a predetermined threshold; and
    adjusting, based on the detecting, a screen configuration of the content, wherein the adjusting comprises:
        removing the content from a portion of the flexible display corresponding to the surface that the removable keyboard is detected as being attached to; and
        displaying an entirety of the content on another portion of the flexible display corresponding to the surface that the removable keyboard is not attached to.

2. The method of claim 1, wherein the information handling device is a foldable device.

3. The method of claim 1, wherein the first surface is a B-cover of the information handling device and wherein the second surface is a C-cover of the information handling device.

4. The method of claim 1, wherein the adjusting the screen configuration comprises adjusting a size of at least one object in the content.

5. The method of claim 1, wherein the adjusting the screen configuration comprises adjusting a position of at least one object in the content.

6. The method of claim 1, further comprising recognizing the removable keyboard as an input device.

7. An information handling device, comprising:
    at least one sensor;
    a removable keyboard;
    a first surface and a second surface;
    a processor;
    a memory device that stores instructions executable by the processor to:

display content on an inner area of the information handling device, wherein the content is displayed on a flexible display screen situated across the first surface and the second surface;

detect attachment of the removable keyboard on top of: a portion of the flexible display screen situated across the first surface or another portion of the flexible display situated across the second surface, wherein the detecting the attachment comprises identifying that a wireless signal associated with the removable keyboard is greater than a predetermined threshold; and adjust, based on the identifying, a screen configuration of the content, wherein the adjusting comprises:

removing the content from a portion of the flexible display corresponding to the surface that the removable keyboard is detected as being attached to; and displaying an entirety of the content on another portion of the flexible display corresponding to the surface that the removable keyboard is not attached to.

8. The information handling device of claim 7, wherein the information handling device is a foldable device.

9. The information handling device of claim 7, wherein the first surface is a B-cover of the information handling device and wherein the second surface is a C-cover of the information handling device.

10. The information handling device of claim 7, wherein the instructions executable by the processor to adjust the screen configuration comprise instructions executable by the processor to adjust a size of at least one object in the content.

11. The information handling device of claim 7, wherein the instructions executable by the processor to adjust the screen configuration comprise instructions executable by the processor to adjust a position of at least one object in the content.

12. An information handling device, comprising:

a first content display surface and a second content display surface, wherein the first content display surface is adjacent to the second content display surface;

a flexible display screen situated across the first content display surface and the second content display surface and wherein the flexible display is located within an inner area of the information handling device;

an attachment mechanism configured to secure a removable keyboard to the information handling device; and a memory device that stores instructions executable by the processor to:

detect attachment of the removable keyboard to one of: a portion of the flexible display screen situated across the first surface or another portion of the flexible display situated across the second surface, wherein the detecting the attachment comprises identifying that a wireless signal associated with the removable keyboard is greater than a predetermined threshold;

wherein the information handling device is foldable.

13. The information handling device of claim 12, wherein the attachment mechanism comprises at least one magnet.

14. The information handling device of claim 13, wherein the at least one magnet is located in a bezel of the second content display surface.

15. The information handling device of claim 14, wherein the first content display surface is operable to fold overtop of the second content display surface securing the removable keyboard.

16. The information handling device of claim 13, wherein the at least one magnet is located on an opposite surface from the first content display surface.

* * * * *